(12) United States Patent
Gralnick et al.

(10) Patent No.: US 8,065,606 B1
(45) Date of Patent: Nov. 22, 2011

(54) SYSTEM AND METHOD FOR AUTOMATING DOCUMENT GENERATION

(75) Inventors: Samuel L. Gralnick, Cold Spring, NY (US); Thomas H. Hill, Midland Park, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 1226 days.

(21) Appl. No.: 11/228,574

(22) Filed: Sep. 16, 2005

(51) Int. Cl.
*G06F 17/00* (2006.01)

(52) U.S. Cl. .................................. 715/234; 715/200

(58) Field of Classification Search .................. 358/1.2; 382/311; 704/1; 707/2, 3, 5, 9, 10, 102; 709/203, 237; 715/200, 201, 202, 203, 209, 715/210, 230, 235, 236, 255, 263, 733, 744, 715/234; 717/168; 719/317; 725/34
See application file for complete search history.

(56) References Cited

U.S. PATENT DOCUMENTS

| | | |
|---|---|---|
| 3,872,448 A | 3/1975 | Mitchell, Jr. |
| 5,159,687 A | 10/1992 | Richburg |
| 5,168,444 A | 12/1992 | Cukor et al. |
| 5,202,986 A | 4/1993 | Nickel |
| 5,278,982 A | 1/1994 | Daniels et al. |
| 5,313,616 A | 5/1994 | Cline et al. |
| 5,347,518 A | 9/1994 | Lee |
| 5,455,946 A | 10/1995 | Mohan et al. |
| 5,471,613 A | 11/1995 | Banning et al. |
| 5,471,629 A | 11/1995 | Risch |
| 5,630,173 A | 5/1997 | Oprescu |
| 5,701,471 A | 12/1997 | Subramanyam |
| 5,748,878 A | 5/1998 | Rees et al. |
| 5,752,034 A | 5/1998 | Srivastava |
| 5,758,061 A | 5/1998 | Plum |
| 5,764,972 A | 6/1998 | Crouse et al. |
| 5,774,553 A | 6/1998 | Rosen |
| 5,784,557 A | 7/1998 | Oprescu |
| 5,787,402 A | 7/1998 | Potter et al. |
| 5,828,883 A | 10/1998 | Hall |
| 5,832,523 A | 11/1998 | Kanai et al. |

(Continued)

FOREIGN PATENT DOCUMENTS

WO WO 95/03586 2/1995

(Continued)

OTHER PUBLICATIONS

Swierk et al., "The Roma Personal Metadata Service", Mobile Networks and Applications 7, p. 407-418, copyright 2002.*

(Continued)

*Primary Examiner* — Amelia Rutledge
(74) *Attorney, Agent, or Firm* — Lowenstein Sandler PC

(57) ABSTRACT

A system and a method for generating a document and maintaining the integrity of the document includes compiling a superset of data into a data heap from multiple data sources, where the data heap corresponds to a start date and one or more clients. The system generates the document using content elements, which are created using the compiled data, and embeds the content elements into the document. The document then is accessible through an associated software application. The data heap is saved and attached to the document. When the document is modified or edited in any manner, the system automatically saves the modified document as a new version. Additionally, the data heap is synchronized to the associated document and, therefore, is regenerated and saved as a new version along with the modified document.

7 Claims, 2 Drawing Sheets

U.S. PATENT DOCUMENTS

| | | | |
|---|---|---|---|
| 5,835,770 A | 11/1998 | Shum et al. | |
| 5,845,293 A | 12/1998 | Veghte et al. | |
| 5,872,976 A | 2/1999 | Yee et al. | |
| 5,907,846 A | 5/1999 | Berner et al. | |
| 5,920,719 A | 7/1999 | Sutton et al. | |
| 5,970,496 A * | 10/1999 | Katzenberger | 707/102 |
| 5,978,477 A | 11/1999 | Hull et al. | |
| 6,009,405 A | 12/1999 | Leymann et al. | |
| 6,012,087 A | 1/2000 | Freivald et al. | |
| 6,014,671 A | 1/2000 | Castelli et al. | |
| 6,026,237 A | 2/2000 | Berry et al. | |
| 6,029,002 A | 2/2000 | Afifi et al. | |
| 6,029,175 A | 2/2000 | Chow et al. | |
| 6,058,393 A | 5/2000 | Meier et al. | |
| 6,065,009 A | 5/2000 | Leymann et al. | |
| 6,081,808 A | 6/2000 | Blackman et al. | |
| 6,108,698 A | 8/2000 | Tenev et al. | |
| 6,125,390 A | 9/2000 | Touboul | |
| 6,138,112 A | 10/2000 | Slutz | |
| 6,138,158 A | 10/2000 | Boyle et al. | |
| 6,145,121 A | 11/2000 | Levy et al. | |
| 6,163,776 A | 12/2000 | Periwal | |
| 6,167,534 A | 12/2000 | Straathof et al. | |
| 6,188,400 B1 | 2/2001 | House et al. | |
| 6,226,652 B1 | 5/2001 | Percival et al. | |
| 6,237,143 B1 | 5/2001 | Fontana et al. | |
| 6,243,862 B1 | 6/2001 | Lebow | |
| 6,256,635 B1 | 7/2001 | Arrouye et al. | |
| 6,263,121 B1 | 7/2001 | Melen et al. | |
| 6,266,683 B1 | 7/2001 | Yehuda et al. | |
| 6,269,479 B1 | 7/2001 | Puram | |
| 6,279,008 B1 | 8/2001 | Tung Ng et al. | |
| 6,301,701 B1 | 10/2001 | Walker et al. | |
| 6,311,320 B1 | 10/2001 | Jibbe | |
| 6,311,327 B1 | 10/2001 | O'Brien et al. | |
| 6,336,122 B1 | 1/2002 | Lee et al. | |
| 6,356,920 B1 | 3/2002 | Vandersluis | |
| 6,381,609 B1 | 4/2002 | Breitbart et al. | |
| 6,385,618 B1 | 5/2002 | Ng et al. | |
| 6,397,221 B1 | 5/2002 | Greef et al. | |
| 6,405,209 B2 | 6/2002 | Obendorf | |
| 6,411,957 B1 | 6/2002 | Dijkstra | |
| 6,418,446 B1 | 7/2002 | Lection et al. | |
| 6,418,448 B1 | 7/2002 | Sarkar | |
| 6,418,451 B1 | 7/2002 | Maimone | |
| 6,446,062 B1 * | 9/2002 | Levine et al. | 707/3 |
| 6,449,623 B1 | 9/2002 | Bohannon et al. | |
| 6,453,310 B1 | 9/2002 | Zander | |
| 6,456,995 B1 | 9/2002 | Salo et al. | |
| 6,467,052 B1 | 10/2002 | Kaler et al. | |
| 6,477,540 B1 | 11/2002 | Singh et al. | |
| 6,490,581 B1 | 12/2002 | Neshatfar et al. | |
| 6,502,095 B2 | 12/2002 | Breitbart et al. | |
| 6,502,101 B1 * | 12/2002 | Verprauskus et al. | 1/1 |
| 6,502,104 B2 | 12/2002 | Fung et al. | |
| 6,532,467 B1 | 3/2003 | Brocklebank et al. | |
| 6,535,894 B1 | 3/2003 | Schmidt et al. | |
| 6,539,337 B1 | 3/2003 | Provan et al. | |
| 6,539,383 B2 | 3/2003 | Charlet et al. | |
| 6,539,397 B1 | 3/2003 | Doan et al. | |
| 6,539,398 B1 | 3/2003 | Hannan et al. | |
| 6,557,039 B1 | 4/2003 | Leong et al. | |
| 6,564,048 B1 | 5/2003 | Sugita | |
| 6,571,249 B1 | 5/2003 | Garrecht et al. | |
| 6,574,640 B1 | 6/2003 | Stahl | |
| 6,578,129 B1 | 6/2003 | da Silva Junior et al. | |
| 6,591,260 B1 | 7/2003 | Schwarzhoff et al. | |
| 6,601,075 B1 | 7/2003 | Huang et al. | |
| 6,633,578 B1 * | 10/2003 | Matsumaru et al. | 370/419 |
| 6,651,076 B1 | 11/2003 | Asano | |
| 6,665,086 B2 | 12/2003 | Hull et al. | |
| 6,678,705 B1 | 1/2004 | Berchtold et al. | |
| 6,681,380 B1 | 1/2004 | Britton et al. | |
| 6,691,139 B2 | 2/2004 | Ganesh et al. | |
| 6,697,835 B1 | 2/2004 | Hanson et al. | |
| 6,701,514 B1 | 3/2004 | Haswell et al. | |
| 6,711,594 B2 | 3/2004 | Yano et al. | |
| 6,714,219 B2 | 3/2004 | Lindhorst et al. | |
| 6,763,384 B1 | 7/2004 | Gupta et al. | |
| 6,880,010 B1 | 4/2005 | Webb et al. | |
| 6,918,013 B2 | 7/2005 | Jacobs et al. | |
| 6,920,467 B1 | 7/2005 | Yoshimoto | |
| 6,934,934 B1 | 8/2005 | Osborne, II et al. | |
| 6,938,072 B2 | 8/2005 | Berman et al. | |
| 7,010,757 B2 | 3/2006 | Stana et al. | |
| 7,231,598 B1 * | 6/2007 | Sawicki et al. | 715/236 |
| 7,480,856 B2 * | 1/2009 | Jones | 715/234 |
| 2002/0007287 A1 | 1/2002 | Straube et al. | |
| 2002/0029228 A1 | 3/2002 | Rodriguez et al. | |
| 2002/0038226 A1 | 3/2002 | Tyus | |
| 2002/0038320 A1 | 3/2002 | Brook | |
| 2002/0049666 A1 | 4/2002 | Reuter et al. | |
| 2002/0065695 A1 | 5/2002 | Francoeur et al. | |
| 2002/0083034 A1 | 6/2002 | Orbanes et al. | |
| 2002/0091702 A1 | 7/2002 | Mullins | |
| 2002/0116205 A1 | 8/2002 | Ankireddipally et al. | |
| 2002/0143774 A1 | 10/2002 | Vandersluis | |
| 2002/0144101 A1 | 10/2002 | Wang et al. | |
| 2002/0178439 A1 | 11/2002 | Rich et al. | |
| 2002/0188765 A1 | 12/2002 | Fong et al. | |
| 2003/0014421 A1 | 1/2003 | Jung | |
| 2003/0018666 A1 | 1/2003 | Chen et al. | |
| 2003/0027561 A1 | 2/2003 | Iyer | |
| 2003/0046313 A1 | 3/2003 | Leung et al. | |
| 2003/0050931 A1 | 3/2003 | Harman et al. | |
| 2003/0065644 A1 | 4/2003 | Horman et al. | |
| 2003/0069975 A1 | 4/2003 | Abjanic et al. | |
| 2003/0070158 A1 | 4/2003 | Lucas et al. | |
| 2003/0088593 A1 | 5/2003 | Stickler | |
| 2003/0121008 A1 * | 6/2003 | Tischer | 715/530 |
| 2003/0126151 A1 | 7/2003 | Jung | |
| 2003/0131007 A1 | 7/2003 | Schirmer et al. | |
| 2003/0140045 A1 | 7/2003 | Heninger et al. | |
| 2003/0140308 A1 | 7/2003 | Murthy et al. | |
| 2003/0145047 A1 | 7/2003 | Upton | |
| 2003/0149934 A1 * | 8/2003 | Worden | 715/513 |
| 2003/0163603 A1 | 8/2003 | Fry et al. | |
| 2003/0167266 A1 | 9/2003 | Saldanha et al. | |
| 2003/0167445 A1 | 9/2003 | Su et al. | |
| 2003/0177118 A1 | 9/2003 | Moon et al. | |
| 2003/0177341 A1 | 9/2003 | Devillers | |
| 2003/0191849 A1 | 10/2003 | Leong et al. | |
| 2003/0200459 A1 * | 10/2003 | Seeman | 713/200 |
| 2003/0217033 A1 | 11/2003 | Sandler et al. | |
| 2003/0217083 A1 | 11/2003 | Taylor | |
| 2004/0060006 A1 | 3/2004 | Lindblad et al. | |
| 2004/0122872 A1 | 6/2004 | Pandya et al. | |
| 2004/0153972 A1 * | 8/2004 | Jaepel et al. | 715/530 |
| 2005/0027658 A1 | 2/2005 | Moore et al. | |
| 2005/0039107 A1 * | 2/2005 | Hander et al. | 715/500 |
| 2005/0060345 A1 | 3/2005 | Doddington | |
| 2005/0065987 A1 | 3/2005 | Telknowski et al. | |
| 2006/0120353 A1 * | 6/2006 | Farrell et al. | 370/352 |

FOREIGN PATENT DOCUMENTS

| | | |
|---|---|---|
| WO | WO 96/34350 | 10/1996 |
| WO | WO 02/46980 | 6/2002 |

OTHER PUBLICATIONS

Hilbert; Hilbert, et al., An Approach to Large Scale Collection of Application Usage Data Over the Internet, Software Engineering 1998, Proceedings of the 1998 International Conference, Abstract, Apr. 1998.

Quantitative Monitoring of Software Development by Time-Based and Intercheckpoint Monitoring, Software Engineering Journal, vol. 5, Iss. 1, p. 43-49, Abstract, Jan. 1990.

Sammet; Beginning of 4.6 Software Evaluation, Tests and Measurements and RMF I/O Time Validation, Association of Computing Machinery, p. 519.

Duggan; 2.40 General—Reviews and Abstracts, SPI Database of Software Technologies, p. 1-5, Feb. 1, 1974.

Vanbommel; Genetic Algorithms for Optimal Logical Database Design Information and Software Technology, vol. 36, No. 12, p. 725-732, 1994.

Xu; Erdraw: An XML-Based ER-Diagram Drawing and Translation Tool.

Hellerstein; A Generalized Search Tree for Database Systems, Jan. 19, 1996.

Ramakrishnan; Tree-Structured Indexes Module 2, Lectures 3 and 4.

Chen et al.; Improving Index Performance Through Prefetching School of Computer Science Carnegie Mellon University, Dec. 2000.

Van Steen et al.; Model for Worldwide Tracking of Distributed Objects, Vrije Universiteit, Amsterdam.

Moser; Transactions in a Distributed Object Environment, Department of Electrical and Computer Engineering, Jun. 19, 2005.

Strom et al.; Gryphon: An Information Flow Based Approach to Message Brokering, International Symposium on Software Reliability, Jun. 20, 2005.

Deng et al.; A Probabilistic Approach to Fault Diagnosis in Linear Lighwaves Network, Department of Electrical Engineering, May 1992, pp. 1-122.

Deutsch et al.; Storing Semistructured Date With Stored; pp. 431-442.

McConnell; Gauging Software Readiness With Defect Tracking; IEEE; May/Jun. 1997.

Programmer'S Guide; Monitor Client Library 12.5; Document ID 32865:01-1250-01.

Jagadish et al; Tax: A Tree Algebra for XML; University of Michigan, Ann Arbor, MI; pp. 149-164; 2002.

Jagadish et al.; Timber: A Native XML Database; The VLDB Journal (2002); pp. 274-291; Published Online Dec. 19, 2002.

Yu, et al.; An Analysis of Several Software Defect Models; IEEE Transactions on Software Engineering, vol. 14., No. 9; Sep. 1988.

"Cache." Microsoft Press Computer Dictionary. Third Edition. 1997.

"Cache." Cache@computer-dictionary-online.org. Jun. 25, 1997. <www.computer-dictionary-online.org>.

"Cache." Microsoft Press Computer Dictionary. Third Edition. 1997 3 pages.

"Cache." Cache@computer-dictionary-online.org. Jun. 25, 1997. <www.computer-dictionary-online.org>. 2 pages.

* cited by examiner

SYSTEM AND METHOD FOR AUTOMATING DOCUMENT GENERATION

BACKGROUND OF THE INVENTION

1. Field of the Invention

The present invention relates generally to a system and a method for generating computer-accessible documents from a plurality of data sources and maintaining the integrity of the documents.

2. Related Art

It is common when generating a business document, such as a text file or presentation slides, to draft, review, and revise the document multiple times before a final document is produced. Often, such a document includes data imported from multiple sources and multiple applications external to the document. Typically, the importation of data into a document is performed manually, once a user has located the relevant data. Generating a document that requires a large volume of data to be imported, such as, for example, presentation slides in which data from multiple sources are compiled, can take weeks, sometimes even months, to produce depending on the size of the document.

Additionally, because a document often is edited and revised multiple times before a final document is produced, changes between each version of the document are lost when a new version is not created for each time the document is modified. If multiple users have access to the document, maintaining the integrity of the document becomes increasingly difficult. Accordingly, a need exists for an improved way of automating the creation of documents that utilize external or imported data, and for an improved means of maintaining the integrity of such documents in order to reduce the time and human error often associated with documents made through the collaborative efforts of multiple users.

SUMMARY OF INVENTION

The present invention provides a system and a method that compiles and assembles data from multiple sources and generates documents using structured elements that incorporate the compiled data. Maintenance of each generated document is controlled by the system through automatic "versioning" or version creation for modifications made to the generated document. By automating the compilation of relevant data for a document and maintaining each document's integrity through automatic versioning, the time and human error associated with generating documents using data from multiple data sources are reduced significantly.

According to the invention, the system includes a content building application, referred to herein as a content builder, multiple application program interfaces (APIs) to interface with multiple data sources, a catalog of predefined structured elements or content elements, and a data map. The system also includes sets of instructions and templates for generating different types of documents using the content builder, such as, for example, slides for a PowerPoint™ presentation, or a portable document format (PDF) document. A content element is a collection of data structured into a type of display that is embedded into the document by the content builder. The content elements may be grouped into categories, such as, for example, corporate financial data, risk exposure data, and credit profitability data. Each content element includes a data type, such as, for example, a chart or a graph, and data gathered from a compilation or superset of data retrieved by the system from multiple data sources, referred to herein as a data heap. Each content element also includes instructions for locating and retrieving the associated data from within a data heap generated by the system, and instructions for formatting and presenting the content element within the document.

As mentioned above, a data heap is a collection of data retrieved by the system from multiple data sources. When the system is generating a document, the data heap is maintained in a temporary memory that is accessible by the content builder. The data heap is created using a hierarchical structure, similar to structures associated with an extensible markup language (XML) document. Once the content builder has generated the document, the system may save the associated data heap, for example, as an XML document, and attaches the saved data heap file to the generated document. The system also includes a user interface, such as an Internet Web page.

The content builder uses a data map to retrieve data from multiple data sources. The data map includes the locations of the data from the multiple data sources and instructions for generating a data heap. The data map also assists in creating a content element because the data map contains the layout of the data within the data heap. Thus, the content builder accesses the data map to determine where data relevant to each content element is located within the data heap.

According to an embodiment of the present invention, a computer-readable storage medium storing computer code for implementing the method of generating and maintaining a document, described herein, is provided.

According to an embodiment of the present invention, a method for generating a document and maintaining the integrity of the document is provided. The method includes steps for a user accessing a system according to the present invention via a user interface, such as, for example, a Web page. The user is prompted to select a type of document to be created and to input a beginning date or start date for the system to retrieve data. The user also is prompted to input one or more clients, for example, by name, by category, or by group, in order for the system to retrieve data associated with the clients.

Upon receiving the user inputs, the system queries multiple data sources from within the user's organization or external to the user's organization for all data corresponding to the inputted clients and generated no earlier than the start date inputted by the user. To locate the data, the system uses a data map to retrieve the pertinent data from the corresponding data sources. The system then generates a data heap, which is a superset of all the data corresponding to the inputted start date and clients. The system formats the data heap using a hierarchical structure, with the inputted start date serving as a root node or element and the inputted clients following as child nodes descending from the root node (the inputted start date). Descending from each client are attribute nodes containing associated business data. Each attribute may have a name, a value, a data source identifier, a date and time stamp corresponding to the date and time the system retrieved the data, and one or more flags characterizing the data associated with each attribute.

The system then outputs a list of content elements to the user. The user selects which content elements are to be present in the generated document. Because each content element is, in essence, a data graphic file, the user may instruct the system to generate a document with "built in" or embedded graphics, such as, for example, spreadsheets, tables, charts, and other pictorial and/or graphical presentations of data. Since each content element is created using data retrieved from multiple data sources, the content builder replaces the typical process of manually searching for and retrieving data from multiple data sources, and then manually creating spreadsheets, tables, charts, and other presentations of the data.

The system receives the selected content elements and generates or builds the document using the content builder. For each selected content element, the content builder references the data map to locate the relevant data. The content builder then creates each selected content element according to the instructions associated with each content element. The system then generates the document according to the stored predefined templates and embeds the selected content elements.

The system saves the generated document and outputs it to the user according to user-inputted instructions. Additionally, the system saves the data heap associated with the document, preferably as an XML document, and attaches it to the document. In doing so, the system provides a "snapshot" of all the possible data provided to the user at the time the document was created. The user then may access the document through an applicable business, commercial, or other application in order to add, remove, or modify unstructured content, such as, for example, the text or the page layout of the document. Once the user has modified the document, the system automatically saves the document as a new version. Thus, the integrity of the document is maintained automatically by the system, which reduces human error typically associated with document revisions.

Alternatively, the user may wish to revise one or more content elements in the document. To do so, the user accesses the system via the user interface, and opens the document using the system. The system displays the content elements and the associated data previously selected by the user to generate the document. The user may view each content element and the respective data in aggregate form. The user also may view the respective data of each content element in detail. Optionally, the system generates a new data heap to provide the user with the most up-to-date data associated with the clients previously selected by the user. At this point, the user may modify the content elements in the document, may add and/or remove content elements, or may instruct the system to generate an entirely new document. Modifications involving content elements are flagged within the data of the content elements. Once the user completes the modifications, the content builder regenerates the document and automatically saves the regenerated document as a new version. Additionally, the system automatically saves the regenerated data heap as a new version of the original data heap and attaches the regenerated data heap file to the new version of the document. The system maintains synchronicity between the document and the associated data heap in order to allow a user to view all the relevant data available at the time each version of the document was created. By automatically generating new versions of both the document and the data heap, the system maintains the integrity of the document without requiring manual intervention.

Thus, the system significantly reduces time and human error associated with generating documents that utilize large amounts of data from multiple data sources spread throughout a corporation.

The documents referred to herein may be of any type, including but not limited to, text, presentation, multimedia, etc. Preferably, the documents are business documents with financial data.

BRIEF DESCRIPTION OF THE DRAWINGS

The present invention will be more readily understood from the detailed description presented below considered in conjunction with the attached drawings, of which.

DETAILED DESCRIPTION OF THE INVENTION

Figure 1:
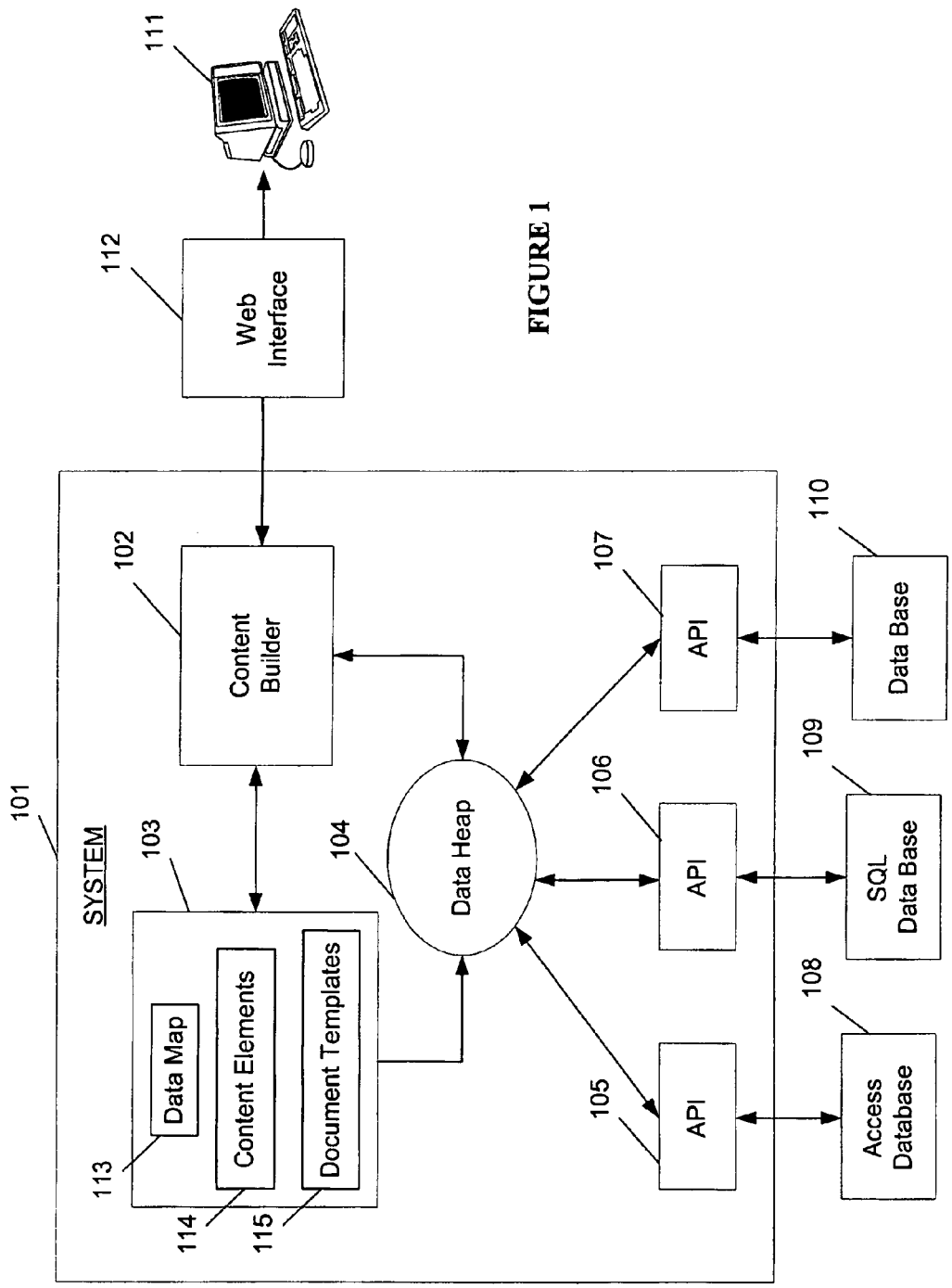
FIG. 1 illustrates a document-generation system, according to an embodiment of the present invention.

FIG. 1 illustrates an arrangement of a system 101 for automating the generation of business documents according to an embodiment of the present invention. The system 101 includes a content building application 102, or content builder, and a repository 103 that contains a data map 113, a catalog of content elements 114, and one or more document templates 115. The system 101 also includes one or more APIs 105, 106, 107, which allow the system 101 to interface with multiple sources of data, such as, for example, a Microsoft Access™ database 108, an SQL database 109, or some other database 110. A user may utilize the system at a workstation 111 and access the system 101 through a user interface 112, such as a Web page. A data heap 104 is maintained in a temporary computer-readable memory within the system 101 while the content builder 102 is used to create a document. Although not shown, the system 101 includes a standard microprocessor for executing the content building application and other software applications and routines discussed below.

Figure 2:
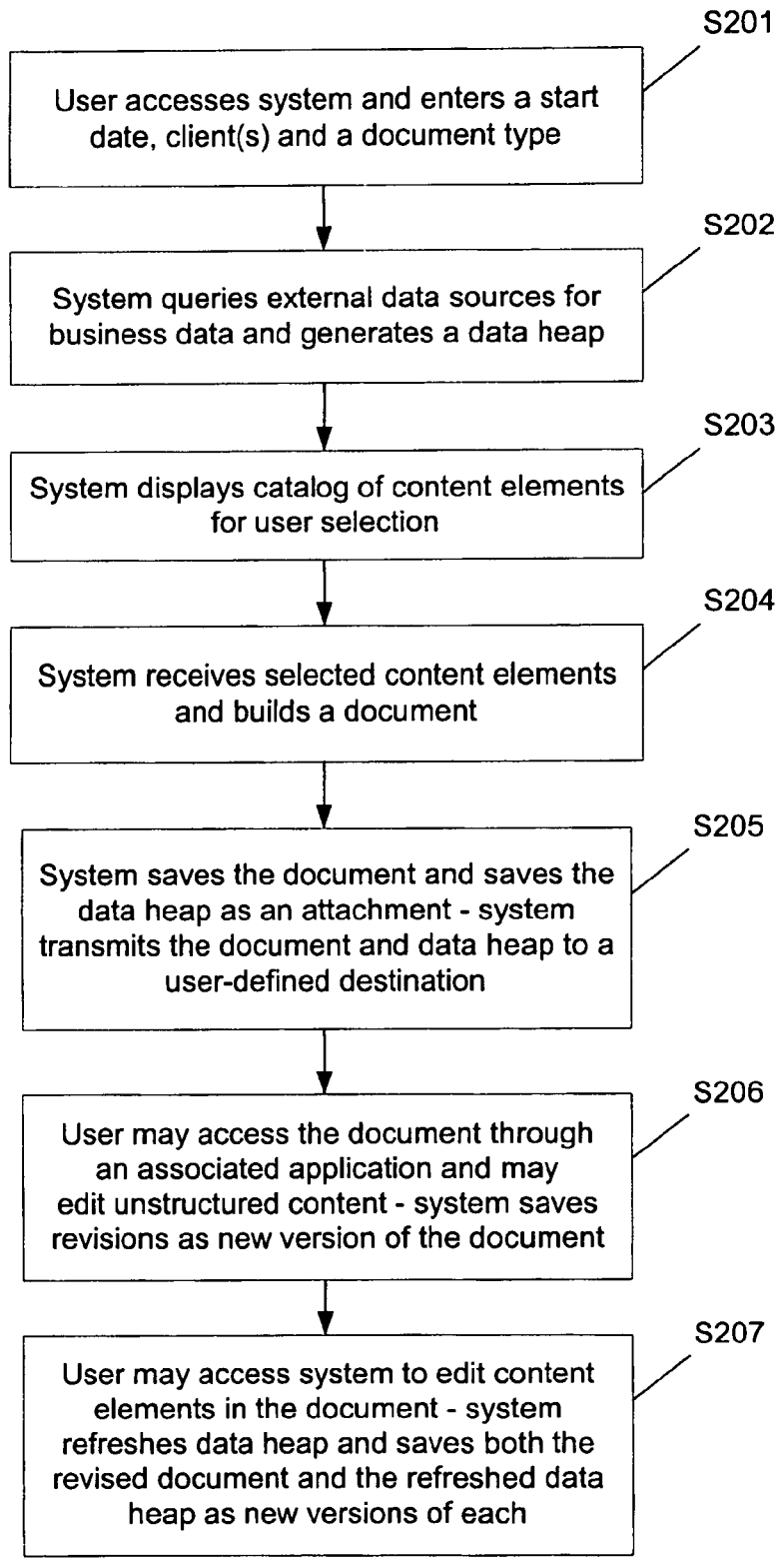
FIG. 2 is a flow chart describing a processing flow of a method for generating a document and maintaining document integrity, according to an embodiment of the present invention.

FIG. 2 illustrates a method for automating the generation of documents according to an embodiment of the present invention. The steps of the method need not be taken in the sequence illustrated, and some steps may be implemented essentially simultaneously. In step S201, a user, such as, for example, the user 111, accesses the system 101 via the user interface 112. For example, if the system is a Web-based system, the user 111 accesses the system 101 through a Web page. The user 111 may enter login information, such as a user identification number and a password. Once the user 111 has accessed the system 101, the user 111 is prompted to select a type of document to be generated, such as a presentation, a word processing (text) document, or a PDF document. The user 111 also is prompted to enter a start date and one or more client identifiers. Clients may be identified individually as well as identified by one or more groups or categories. For example, the user 111 may wish for the system 101 to retrieve all data relevant to clients in the oil and gas industry beginning from the end of the first quarter in 2002. Thus, at step S201, the user 111 enters a start date of 03312002 and an alphanumerical identifier for oil and gas clients.

At step S202, the system 101 receives the user inputs and queries multiple data sources, such as the databases 108, 109, 110, for data corresponding to the inputted date and client identifiers. The system 101 utilizes the data map 113 to determine which databases contain the appropriate data. The data map 113 is pre-constructed by a system administrator and includes the locations of data within a corporation. Thus, the system 101 may determine that data sources 108, 109, 110 may hold all of the data corresponding to the inputted date and client identifiers and retrieves the data from data sources 108, 109, 110 using the applicable APIs 105, 106, 107.

Upon retrieving the corresponding data via the APIs 105, 106, 107, the system 101 creates and stores a data heap 104 in a computer-readable memory, which temporarily stores all of the retrieved data. The data heap 104 is structured according to a set of instructions included in the data map 113. The data map 113 instructs the system 101 to generate the data heap 104 using a hierarchical structure. The inputted start date is at the top of the hierarchy and serves as the root node of the hierarchical structure. Each inputted client (child node) then descends directly from the root node, i.e., the inputted start date. Descending from each child node are data nodes containing all of the data retrieved for each client. These data nodes are referred to herein as attribute nodes. An attribute node may contain the following information: a name, a value, a data source identifier, a date and/or time stamp corresponding to the date and time the attribute was retrieved by the system 101, and one or more flags characterizing the data of the attribute. Thus, the data heap 104 contains all of the data associated with the inputted client identifiers, which has a date no earlier than the start date inputted by the user 111.

At step S203, the system 101 outputs the content elements 114 maintained in the repository 103 to the user 111. The user 111 selects the content elements to be included in the document and instructs the system 101 to build the document. At step S204, the content building application 102 generates the document using the document templates 115 stored in the repository 103. The content building application 102 then generates each selected content element by first locating the corresponding data within the data heap 104 according to the data map 113. Because the data heap 104 is structured according to instructions provided in the data map 113, the location of any data for any content element is found within the data map 113. Additionally, the content building application 102 formats the content element according to instructions stored within the content element. The system 101 then embeds the formatted content elements into the document.

At step S205, the system 101 saves the document and saves the data heap 104 as an XML document. Thus, the system maintains a "snapshot" image of the data heap used to generate the associated document. The system 101 then transmits the document to a destination according to user-inputted instructions.

At step S206, the user 111 may access the document using a business, commercial, or other software application that corresponds to the type of the document created. Preferably, although not required, only one user may access and edit the document at any given time in order to maintain the integrity of the document. For example, if the system 101 generated slides for a presentation, the user 111 may access the document using a presentation software application, such as Microsoft PowerPoint™. Upon doing so, the user 111 may add, remove, and/or edit any unstructured content of the document, where unstructured content is content that is not associated with a content element. Once the user 111 is finished working and attempts to exit the document, the system 101 automatically saves the revised document as a new version. Thus, no content is lost between versions of the document.

At step S207, the user 111 may revise the content elements within the document by accessing the document using the system 101 via the user interface 112. The system 101 provides a list of the content elements presently embedded in the document and the data underlying each content element. Additionally, the system 101 generates a new version of the original data heap 104 associated with the document, so that the user 111 has the most recent data available. The user 111 then may add or remove content elements, and/or may modify the document entirely. In each content element that is removed or modified, the content building application 102 flags the fact within the data of the associated content element.

Once the user 111 completes the modifications to the document, the content building application 102 generates a modified document and prompts the system 101 to save the modified document as a new version of the original document. The content building application 102 also prompts the system to save the new version of the data heap 104 as an attachment. Thus, the system 101 provides an updated "snapshot" image of all the data available to the user 111 while the user 111 was modifying the document. The system 101 then outputs the modified document and the associated data heap file to one or more destinations as instructed by the user 111.

While the present invention has been described with respect to what is presently considered to be the preferred embodiment(s), it is to be understood that the invention is not limited to the disclosed embodiment(s). To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for generating and maintaining a user-modifiable document, comprising:
   a processor for executing software routines and applications;
   and a memory; and
   a content building application stored in the memory of the system and executable by the processor,
   wherein the content building application functions to create an updatable data heap by retrieving data from multiple data sources based on a data map stored in the memory, wherein the system automatically saves the data heap each time the data heap is updated;
   wherein the content building application functions to generate a data hierarchy from the data in the updatable data heap, wherein the data hierarchy includes a root node corresponding to a start date and one or more first child nodes corresponding to one or more client identifiers;
   wherein the content building application functions to generate a user-modifiable document from the data in the updatable data heap;
   wherein the processor attaches the data hierarchy to the user-modifiable document as an XML document; and
   wherein the system automatically saves the user-modifiable document, separate from the data heap, each time the user-modifiable document is modified.

2. The system according to claim 1, wherein the content building application uses at least one content element stored in the memory to generate the user-modifiable document.

3. The system according to claim 2, wherein the at least one content element includes any or all of a content element type, business data and a set of instructions for generating the user-modifiable document.

4. The system according to claim 1, further comprising one or more second child nodes descending from the one or more first child nodes, wherein the one or more second child nodes correspond to one or more attributes containing data associated with the one or more first child nodes.

5. The system according to claim 4, wherein data of an attribute includes any or all of a name, a value, a data source identifier, a date stamp, a time stamp, and one or more flags.

6. The system according to claim 1, wherein, when the user-modifiable document is revised by a user, the processor automatically saves the revised user-modifiable document as a new version.

7. The system according to claim 6, wherein a revised data hierarchy is attached to the revised user-modifiable document.

* * * * *